United States Patent [19]

Kondo et al.

[11] Patent Number: 5,050,840

[45] Date of Patent: Sep. 24, 1991

[54] ELECTROMAGNET FOR SOLENOID VALVES AND METHOD OF MANUFACTURING SAME

[75] Inventors: Yusuke Kondo; Shinji Nakamura, both of Nagoya, Japan

[73] Assignee: Sanmeidenki Kabushikikaisha, Aichi, Japan

[21] Appl. No.: 499,446

[22] PCT Filed: Nov. 29, 1989

[86] PCT No.: PCT/JP89/01203

§ 371 Date: Jun. 26, 1990

§ 102(e) Date: Jun. 26, 1990

[87] PCT Pub. No.: WO90/06464

PCT Pub. Date: Jun. 14, 1990

[30] Foreign Application Priority Data

Dec. 1, 1988 [JP] Japan ................................ 63-156900

[51] Int. Cl.[5] .......................... F16K 31/06; H01F 7/16

[52] U.S. Cl. .......................... 251/129.15; 251/129.08; 251/368; 335/297

[58] Field of Search .............. 251/129.15, 368, 129.08; 137/312; 335/297

[56] References Cited

U.S. PATENT DOCUMENTS 3,791,408 2/1974 Saitou et al. ............... 251/129.15 X
4,725,039 2/1988 Kolchinsky ................ 251/129.15 X
4,919,390 4/1990 Ichiryu et al. ............ 251/129.15 X

FOREIGN PATENT DOCUMENTS 139321 9/1979 Japan .
55-65811 5/1980 Japan .
159402 9/1984 Japan .
283106 11/1988 Japan .

*Primary Examiner*—Arnold Rosenthal

*Attorney, Agent, or Firm*—Pollock, Vande Sande & Priddy

[57] ABSTRACT

An electromagnet (A) capable of being used for a solenoid valve. In this electromagnet (A), a pipe unit (6) is provided at one end part thereof with a mounting portion (12) opposed to a valve body (B), and a cap (E) is joined to the other end part thereof. The pipe unit (6) is provided therein with a movable core (24) so that the core (24) can be moved forward and backward therein, and a coil unit (D) is fitted around the outer circumferential surface of the pipe unit (6). The cap (E) and pipe unit (6) are combined with each other by the threads (18, 39) formed in and on the opposed inner and outer circumferential surfaces thereof. In order to fasten the electromagnet (A) to the valve body (B), the pipe unit (6) is connected to the valve body (B), and the coil unit (D) is then fitted around this pipe unit (6), the cap (E) being then screwed to the pipe unit (6). Thus, the coil unit (D) can be set firmly by the cap (E). The cap (E) is provided with an air vent hole (41) opened in the inner circumferential surface thereof. In order to let out the air from the interior of the pipe unit (6), the cap (E) is turned so that the air vent hole (41) is in the highest position, and, when the air vent hole (41) attains the highest position, the air can be released through the same hole (41).

4 Claims, 6 Drawing Sheets

FIG. 1
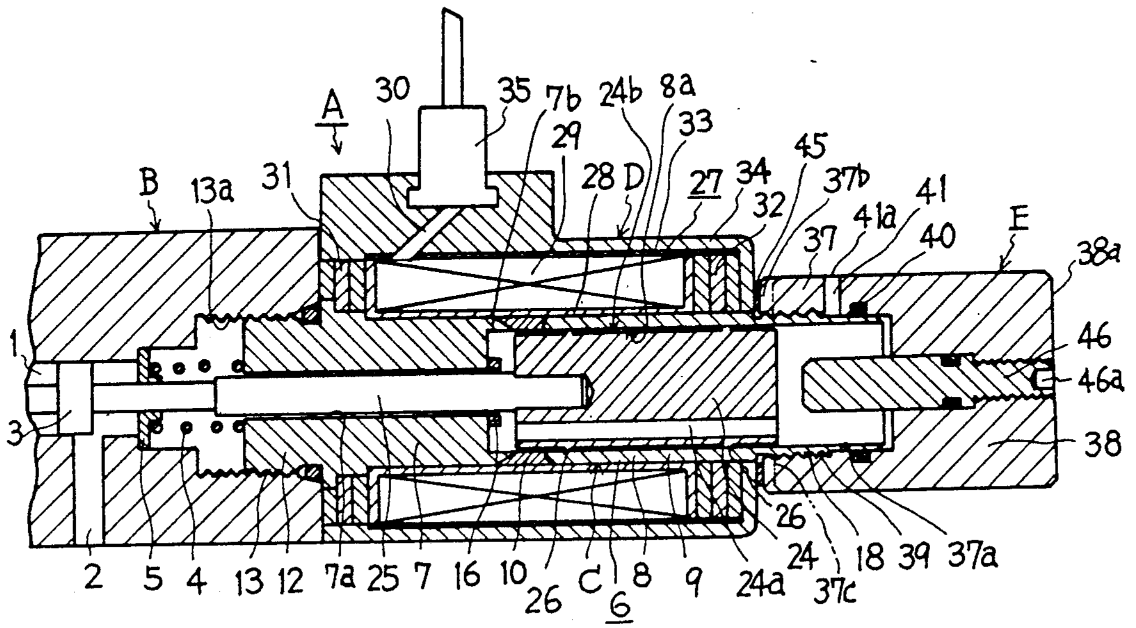
FIG. 3
FIG. 4
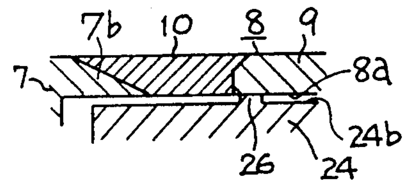
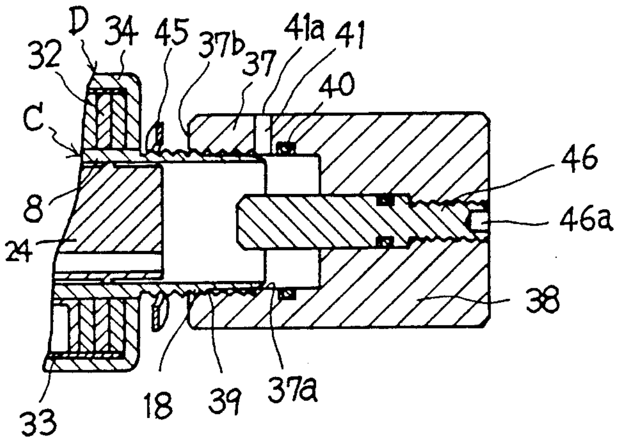
FIG. 5
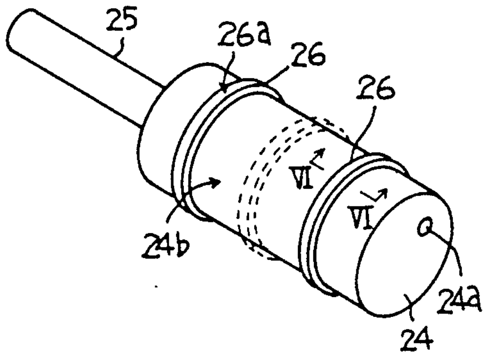
FIG. 6
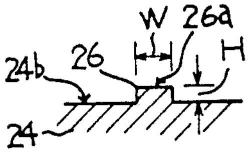

ELECTROMAGNET FOR SOLENOID VALVES AND METHOD OF MANUFACTURING SAME

TECHNICAL FIELD

This invention relates to an electromagnet for solenoid valves, which is used to operate a valve body of a solenoid valve, and more particularly to a so-called wet type electromagnet of a structure having a movable core housed in a pipe unit filled with a liquid.

BACKGROUND ART

The electromagnets of this kind for solenoid valves include an electromagnet shown in FIG. 19. Referring to FIG. 19, a valve body B′ is attached to a base frame of a machine, for example, a machine tool. An electromagnet A′ is fastened to the valve body B′ with setting bolts 50′ with the electromagnet A′ and valve body B′ facing each other in a corresponding condition (for example, in such a condition that the positions of plug pins 54 correspond to those of receptacles 54′ in the valve body B′). Since the valve body B′ is designed in accordance with an object machine, the direction in which the valve body B′ attached to a base frame of the machine faces varies. Accordingly, it is possible that the electromagnet A′ is fastened to the valve body B′ with any of first, second and third surfaces 51, 52, 53 thereof facing in the upward direction. In order that air can be released no matter whichever surface of the electromagnet A′ fastened to the valve body B′ faces in the upward direction, air vent holes 41′ in which packing-carrying plugs 42′ are fitted are provided in the portions of a cap E′ for the electromagnet A′ which correspond to these surfaces 51, 52, 53 respectively.

In this conventional structure, at least three air vent holes 41′ mentioned above are required. However, providing a plurality of such air holes in which packing-carrying plugs are fitted costs a great deal to cause the cost of manufacturing an electromagnet for solenoid valves to increase.

DISCLOSURE OF INVENTION

In an operation of combining the electromagnet for solenoid valves according to the present invention with a valve body, a pipe unit, a coil unit and a cap can be put together simply in order.

In this operation, the coil unit is simply fitted around the pipe unit. When the cap formed so as to seal an opened portion of the pipe unit is then tightened by turning the same, the coil unit is pressed by the cap and set firmly. This enables labor for fixing the coil unit to be saved.

According to the present invention, the cap is formed so that it can be turned as mentioned above. Therefore, the present invention has the following effects when air in the pipe unit is released after the completion of the assembling of the electromagnet. In the case where an air vent hole is provided in one portion of a cap and faces in the lateral or downward direction, it is difficult to let out air from a pipe unit. However, the air remaining in the pipe unit in the present invention can be released by turning the cap a little so as to displace an air vent hole to the upper side. This advantageously enables the extra cost, which is required in the production of a prior art electromagnet of this kind, of forming a plurality of air vent hole structures in the cap to be saved, and the cost of manufacturing an electromagnet for a solenoid valve to be reduced.

When the cap in the present invention is turned so as to be loosened, the air vent hole provided in the cap is allowed to communicate with the interior of the pipe unit. When this cap is turned so as to be tightened, the air vent hole is displaced to the outer side of a packing, so that the air vent hole is shut off from the interior of the pipe unit. Therefore, it is unnecessary to provide the air vent hole with an opening and closing structure. This enables the air vent hole structure to be simplified. The advantage thus achieved constitutes a very profitable solution to the problems in a conventional electromagnet of this kind in which the air vent hole sealing structures incur a lot of expenses.

In the electromagnet according to the present invention, the forward and backward movements of a movable core are guided stably by a pipe. Accordingly, the loci of the forward and backward movements of the movable core become stable.

In the electromagnet according to the present invention, the outer circumferential surface of the movable core contacts the inner circumferential surface of the pipe unit at the portions of only a small area. Namely, only the top surfaces of a plurality of projections provided on the outer circumferential surface of the movable core contact the inner circumferential surface of the pipe unit. Therefore, the frictional force of the movable core with respect to the inner circumferential surface of the pipe unit is extremely small. As a result, the movable core is moved forward and backward lightly. This enables the moving speed of the movable core to be increased. When this electromagnet is applied to a proportional control valve, the deviations of the forward and backward stopping positions of the movable core with respect to a predetermined current level can be reduced. Namely, the accuracy of a position to which the movable core is moved with respect to a coil current level is very high.

The movable core in the electromagnet according to the present invention is produced by inserting a shaft through a hollow formed in a movable core body, and combining the shaft and core body with each other unitarily with a bonding agent. Before this bonding operation, the outer diameter of the portion of the shaft which is inserted through the core body is set in accordance with the inner diameter of the hollow in the core body. In order to bond these two parts together, a bonding agent is applied to the inner circumferential surface of this hollow and the portion of the outer circumferential surface of the shaft which is opposed to this inner circumferential surface. Accordingly, the bonding agent is distributed uniformly and very easily on the inner and outer circumferential surfaces of these two parts. Consequently, the axes of the shaft and core body are aligned with each other easily. The bonding of these two parts is done calmly owing to the hardening of the bonding agent. Consequently, the production of the movable core can be carried out without causing any thermal or mechanical change in the properties of the core body and shaft.

BRIEF DESCRIPTION OF DRAWINGS

FIG. 1 is a longitudinal section of a solenoid valve;

FIG. 3 is a longitudinal section showing the condition of a principal portion in an air vent operation;

FIG. 4 is a sectional view showing the positional relation between a magnetism isolating portion of a pipe unit and projecting portions of a movable core;

FIG. 5 is a perspective view of the movable core;

FIG. 6 is an enlarged sectional view taken along the line VI—VI in FIG. 5;

BEST MODE FOR CARRYING OUT THE INVENTION

In order to make the present invention understood thoroughly, the embodiments thereof will now be described with reference to the accompanying drawings.

Figure 2:
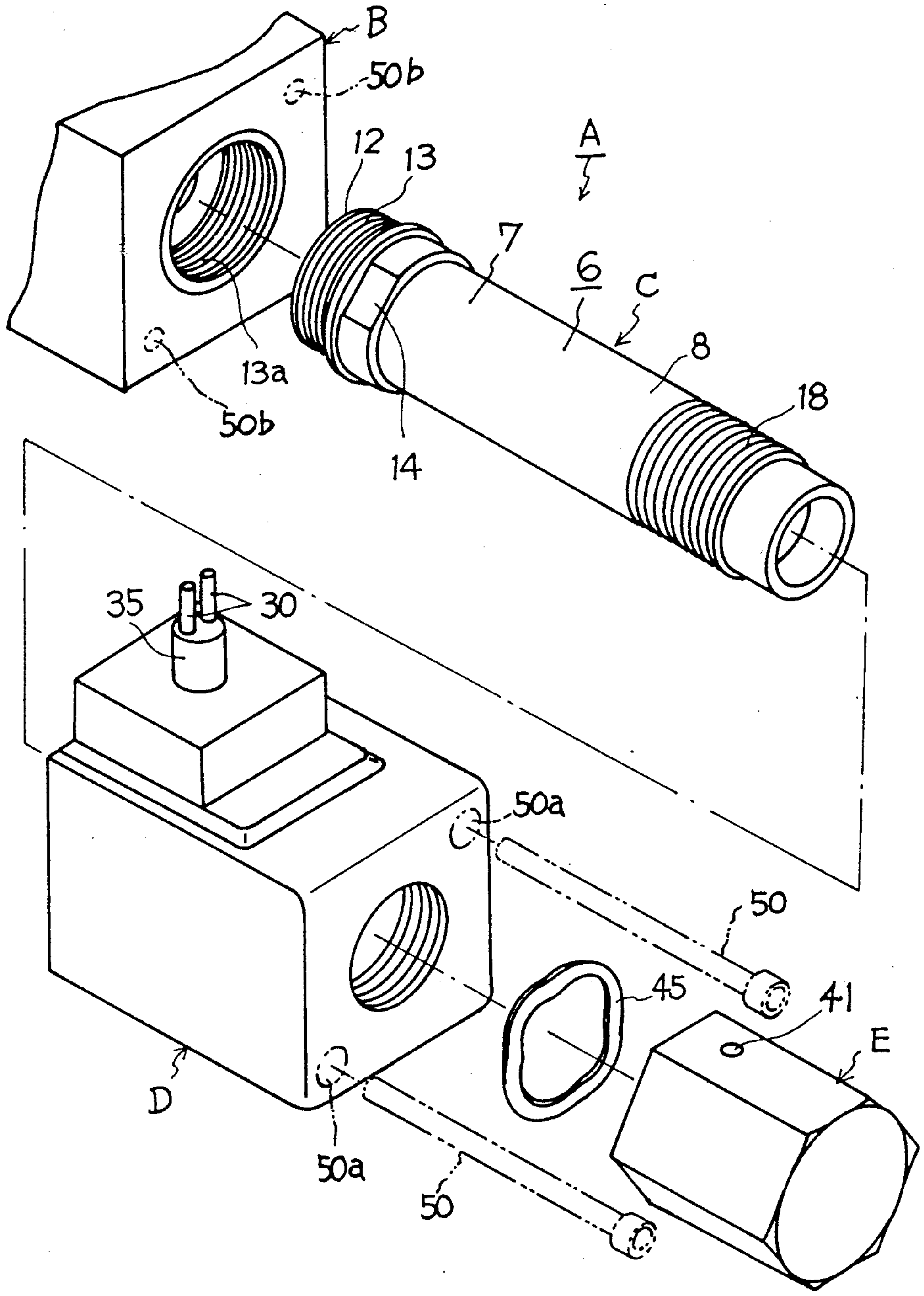
FIG. 2 is an exploded view in perspective.

Referring to FIGS. 1-3, an electromagnet A for solenoid valves is adapted to form an electromagnet by fastening the same to a known valve body B. The valve body B has a known construction, and is provided with a liquid passage 1(which is also called "oil passage"), a port 2, a spool 3 and a spool returning spring 4. The spool 3 can be moved freely in the lateral direction in FIG. 1, and a movement of the spool 3 causes the valve to be opened or closed, or the degree of opening of the valve to be increased or decreased. The spool returning spring 4 applies a return force to the spool 3 via a spring seat 5. This spring is provided on both the left and right sides (right-hand spring only is shown) of the spool 3 to normally set the spool 3 in a neutral position shown in FIG. 1.

The electromagnet A will now be described. This electromagnet A is called a tube type electromagnet or a wet type electromagnet. The electromagnet A consists of a tube assembly C, an annular coil unit D fitted around the tube assembly, and a cap E for closing an opened portion of the tube assembly C and fixing the coil unit D.

The tube assembly C will now be described. The tube assembly C consists of a pipe unit 6 provided with a hollow in which a movable core is to be installed, and a movable core 24 installed in the hollow. The pipe unit 6 has a stationary core 7, and a pipe member 8 unitarily connected to the stationary core 7. The stationary core 7 is formed out of a magnetic material, such as pure iron or low carbon steel. Moreover, it has a horizontal characteristic forming portion 7b. The stationary core 7 is provided at its one end section with a mounting portion 12 formed integrally therewith. The mounting portion 12 is provided on its circumferential surface with a male thread 13 for use in screwing the stationary core 7 to the valve body B, and wrench rests 14 for use in turning the mounting portion 12 into the valve body B in this screwing operation. The stationary core 7 is provided at the other end thereof with a residual magnetism isolating spacer 16 formed out of a non-magnetic material (for example, non-magnetic stainless steel or brass). A portion 9 permeable to magnetic flux of the pipe member 8 is formed out of a magnetic material, such as pure iron or low carbon steel. One end of this permeability portion 9 is joined to the stationary core 7 via a magnetism isolating portion 10 formed out of a non-magnetic material, for example, a copper or the like. The other end section of the permeable portion 9 is opposed at its outer circumferential surface to the cap E, and this opposed surface portion is provided with a connecting male thread 18. The movable core 24 is formed out of a magnetic material, such as pure iron or low carbon steel. Moreover, a working force transmitting pin 25 formed out of a non-magnetic material (for example, non-magnetic stainless steel) is provided on (press fitted into or bonded to) the movable core 24. The movable core 24 is further provided with a liquid flow bore 24*a*. The pin 25 is inserted through a through bore 7*a* formed in the stationary core 7 and opposed to the spool 3. The projections 26 on the outer circumferential surface of the movable core 24 are provided for the purpose of reducing the frictional force occurring between this outer circumferential surface and the inner circumferential surface of the pipe member 8, and are formed in the shape of head-bands on a plurality of portions of the same outer circumferential surface. The top surfaces 26*a* of the projections 26 are plated with a non-magnetic material, for example, electroless nickel (consisting of 90–92% of nickel and 10–8% of phosphorus). Consequently, the attractive force of the projections 26 with respect to the inner surface 8*a* of the pipe member 8 (inner surface of the permeable portion 9) becomes small. The plating of this material may be done on the whole of the outer surface 24*b* of the movable core 24 in addition to the top surfaces 26*a*. The dimensions W, H of the projection 26 shown in FIG. 4 may be determined as follows. The frictional force can be reduced in inverse proportion to the width W but the durability of the projection 26 with respect to abrasion decreases when the width W is set smaller. Therefore, the projection may be formed to such a small width (for example, 1–2 mm) that allows a required level of durability thereof to be obtained. The height H may be set to such a level that can prevent the outer surface 24*b* of the portions of the movable core 24 which are other than those having the projections 26 thereof from contacting the inner surface 8*a* of the pipe member 8. However, when the height H is too large, a magnetic clearance between this surface 24*b* and the inner surface of the permeable portion 9 increases. In view of this, the height H may be set to around 0.05–0.1 mm. The thickness of the coating formed on the top surfaces 26*a* may be set to, for example, 5–50 μm. Such a layer of coating may be formed on the inner surface of the pipe member 8 as well. The forming of the projections 26 is done by, for example, cutting the circumferential surface of the movable core 24. Some other method may be used, in which the plating of the movable core 24 is done so as to form layers of coating of a required thickness as projections 26. Out of these projections 26, the projection 26 provided in a position closest to the stationary core 7 may be formed on the portion of the movable core 24 which does not contact the magnetism isolating portion 10 even when the movable core 24 is moved closest to the stationary core 7, as shown in FIG. 4. This serves to prevent the abrasion of the magnetism isolating portion 10 which is generally formed out of a material of a low abrasion resistance. The projection 26 mentioned above may be provided on three portions of the movable core 24 by forming another as shown in phantom in FIG. 5, or it may also be provided on more than three portions of the movable core 24.

The coil unit D will now be described. A coil body 27 is formed by fitting a coiled wire 29 around a bobbin 28, and a lead wire 30 is drawn out. Yokes 31, 32 are provided so as to extend along both ends of the coil body 27. These yokes 31, 32 are connected together magnetically by a yoke 33. All of these yokes are formed out of a magnetic material, such as pure iron or low carbon steel, and these yokes 31–33 constitutes an external magnetic circuit. The coil body 27 and yokes 31–33 are combined unitarily by a molded member 34. This molded member 34 serves also as a case, and is formed by utilizing a known thermosetting or thermoplastic casting resin having a high thermal resistance. The glass powder is mixed in this resin in some cases for the purpose of improving the mechanical strength of the molded member 34. A bushing 35 for protecting a leading portion of the lead wire 30 is buried in a predetermined portion of the molded member 34. The cap E will now be described. The cap E is formed in a recessed state. It is adapted to close an opened portion at the outer end of the pipe member 8 of the pipe unit 6. The cap has a circumferential side wall 37 and a bottom wall 38. The circumferential side wall 37 is provided with a female thread 39 in the portion of an inner circumferential surface 37*a* thereof which is opposed to the pipe unit 6. The female thread 39 is formed so as to be engaged with the male thread 18. A coil unit pressing portion 37*b* is constituted by an inner end portion of the circumferential side wall 37. An O-ring is used as a liquid lead preventing packing 40. An air vent hole 41 is provided so as to be opened in the position on the inner circumferential surface 37*a* at which the effect which will be described later is obtained. An outer opening 41*a* of the air vent hole 41 is made in the outer circumferential surface of the circumferential side wall 37. The outer opening 41*a* may be made in an outer surface 38*a* of the bottom wall 38. A loosening preventing member 45 is interposed between the coil unit D and the coil unit pressing member 37*b* of the cap E. This loosening preventing member 45 is use consists, for example, of a corrugated washer. A manually operating pin 46 is screwed to the bottom wall 38. When an operating device (for example, a hexagonal key) is fitted in an operating device fitting bore 46*a*, which is provided in the pin 46, and then turned, the pin 46 moves toward and away from the movable core 24. The core 24 can be moved forward by a forward movement of the pin 46.

The use of the electromagnet A for solenoid valves will now be described. The electromagnet A is shipped from a electromagnet manufacturing company in such a condition (as shown in FIG. 1 with the valve body B excluded) that it consists of a combination in which the tube assembly C is enclosed with the coil unit D with the cap E joined to the tube assembly C.

A purchaser of this electromagnet A connects the same to the valve body B (for example, in a laterally fastened state as shown in FIG. 1) in the following manner. The valve body B is attached in advance to a base frame of a machine, such as a machine tool so as to face in a predetermined direction. The purchaser removes the cap E from the tube assembly C first. He then removes the coil unit D from the tube assembly C. The tube assembly C is then joined to the valve body B. To join the tube assembly C to the valve body B, the male thread 13 on the mounting portion 12 of the pipe unit 6 is screwed to the corresponding female thread 13*a* in the valve body B. As a result, the opened portion of the through bore 7*a*, which is on the side of the valve, in the pipe unit 6 communicates with the liquid passage 1. The coil unit D is then fitted around the outer circumference of the tube assembly C. During this time, the direction in which the lead wire 30 is drawn out is determined so as to suit the construction of the machine. The cap E is then joined as shown in FIG. 1 to the tube assembly C by utilizing the connecting male and female threads 18, 39. The liquid passage 1 in the valve body B is then filled with a liquid (generally, an oil to be controlled by this valve). This liquid flows into the interior of the pipe unit 6 in the tube assembly C through the bore 7*a*. An operation of letting out the air residing in the interior of the pipe unit 6 is carried out in the following manner with the interior of the valve body B and pipe body D left in this condition. The cap E is turned so as to be loosened (the threads 18, 39 are loosened) and put in a half-screwed state as shown in FIG. 3. In this condition, the packing 40 is separated from the pipe unit 6, and the air vent hole 41 communicates with the portion of the interior of the pipe unit 6 which is on the inner side of the packing 40. In this cap loosening operation, the cap E is turned so that the air vent hole 41 is displaced to the highest position. When the cap E is thus loosened, the air remaining in the pipe unit 6 escapes to the outside through the air vent hole 41 due to the liquid pressure applied from the valve body B. When all the air finishes escaping, the liquid begins to leak out from the air vent hole 41. The cap E is then tightened (the threads 18, 39 are tightened). When the tightening of the cap E is completed, the packing 40 is interposed in a closely contacting state between the opposed portions of the pipe unit 6 and cap E as shown in FIG. 1. At the same time, the communication of the air hole 41 with the portion of the interior of the pipe unit 6 which is on the inner side of the packing 40 ceases. The air vent hole 41 communicates with the outside only (via the engaged portions of the threads 18, 39). Consequently, the leakage of the liquid stops. Due to the cap tightening operation, the coil unit D is held firmly by the coil unit pressing portion 37*b* to be put in a fixed state. Namely, the coil unit D is put in an axial and rotational movement-prevented state.

The operation of the solenoid valve thus assembled is as follows. An electric current is applied to the coiled wire 29 through the lead wire 30. Consequently, the magnetic flux occurring in the coiled wire 29 flows through a path including the movable core 24, stationary core 7, yokes 31, 33, 32 and permeable portion 9. As a result, a force for attracting the movable core 24 toward the stationary core 7 occurs. Owing to this attractive force, the core 24 moves toward the stationary core 7. During this movement of the core 24, the top surfaces 26a of the projections 26 lightly contact the inner surface 8a of the pipe member 8 (the top surfaces 26a are also called contact surfaces 26a). Accordingly, the core 24 is moved as it is guided by the inner surface 8a. Namely, the core 24 is moved with the position of the outer circumferential surface 24b thereof with respect to the inner surface 8a kept stable. During this time, only the top surfaces 26a of a small width contact the inner surface 8a. Therefore, the frictional force occurring between these surfaces 26a, 8a is very small. Accordingly, the core 24 moves very smoothly. The moving force of the core 24 is transmitted to the spool 3 via the pin 25 to move the spool 3. In accordance with the movement of the spool 3, the degree of opening of the valve increases or decreases.

When the supplying of an electric current to the coiled wire 29 is stopped, the magnetic flux mentioned above is lost. Consequently, the attractive force exerted on the movable core 24 is lost. As a result, the spool 3 in the valve body B is moved back to a neutral position by the return spring 4. Owing to this return force, the core 24 in the electromagnet A is moved back to the position shown in FIG. 1, via the pin 25.

Figure 7:
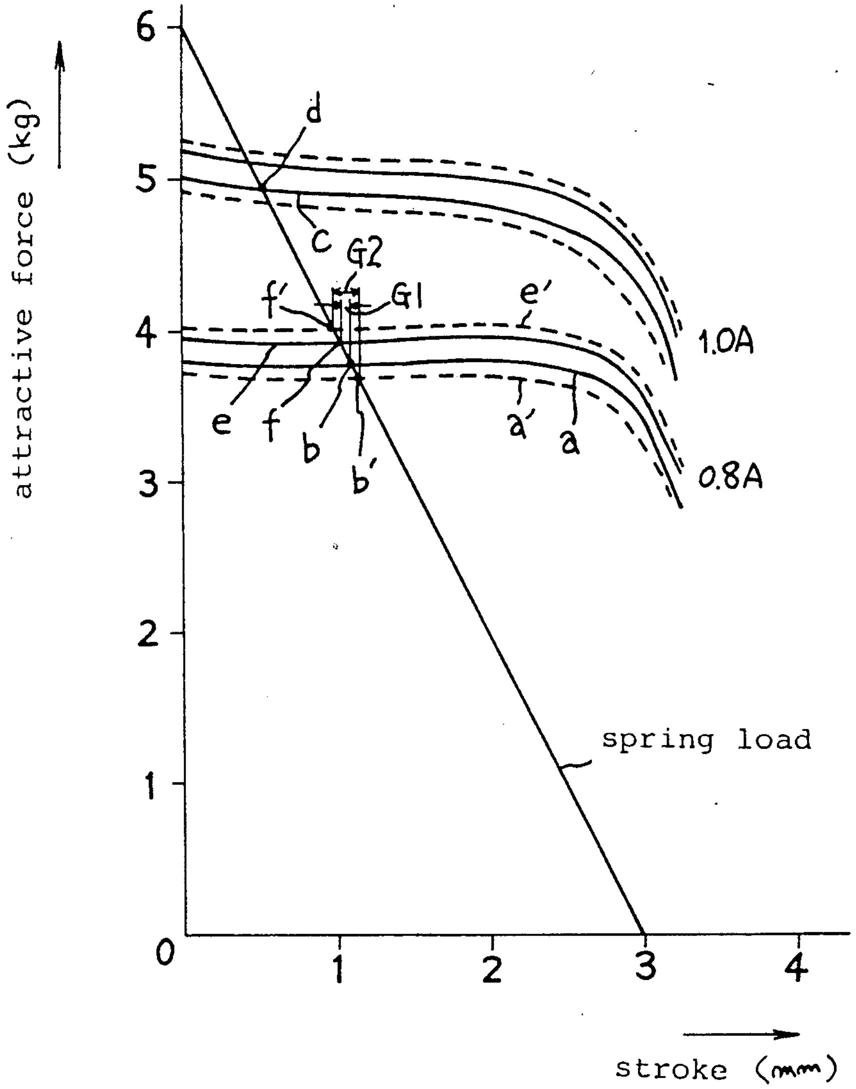
FIG. 7 is an attractive force characteristic diagram.

FIG. 7 shows an example of the attractive force characteristics of the electromagnet A. The movement of the core 24 during the application of an electric current to the coiled wire 29 will now be described on the basis of this characteristic diagram. Referring to FIG. 7, a diagonal line denotes a load, which represents the force applied from the spool returning spring 4 to the spool 3. The solid curves and broken curves show the characteristics of this embodiment and a prior art electromagnet, respectively. These curves indicate the attractive force exerted on the movable core when the electric current is at the levels shown on the right side thereof. The stroke of 0 mm represents the position taken by the movable core 24 when the core 24 is moved closest to the stationary core. The stroke of 3 mm represents the position taken by the movable core 24 when the pin 25 of the core 24 is engaged with the spool in a neutral state. An electric current of, for example, 0.8A is applied to the coiled wire in an unenergized state. Consequently, a force for moving the core 24 toward the stationary core 7 against a spring load occurs due to the magnetic force generated by this current. During this time, the frictional force occurring between the top surfaces 26a of the projections 26 and the inner surface 8a of the pipe member 8 is imparted as a load to the core 24 against the forward force mentioned above. Therefore, the level of the force for advancing the core 24 becomes equal to a difference obtained by subtracting the level of this frictional force from that of the above-mentioned magnetic force. The resultant force is shown by a curve a. The core 24 moves up to a point b (stroke of 1.1 mm) at which this force and the spring load are balanced each other, to stop (position at which the forwardly moving core 24 stops). The level of the electric current is then increased to, for example, 1.0A. In consequence, the force applied to the movable core 24 reaches a level shown by a curve c, and the core.24 advances to a point d to stop.

The level of the current is then reduced to, for example, 0.8A. As a result, the level of the magnetic force occurring due to the current lowers. Accordingly, the core 24 begins to be moved back due to the spring load. During this time, the frictional force referred to above is imparted as a load to the backwardly moving core 24. Namely, the direction of this force is the same direction in which the magnetic force for advancing the core 24 works. Therefore, the level of the force imparted to the core in its advancing direction becomes equal to the sum of those of the above-mentioned magnetic force and frictional force. This force is shown by a curve e. The core 24 is moved back up to a point f (stroke of 1.05 mm) in which this force and spring load are balanced with each other, to stop (position at which the backeardly moving core 24 stops). Thus, the position b at which the forwardly moving core 24 stops and the position f at which the backwardly moving core 24 stops in the case where an electric current of the same level, for example, 0.8A is applied to the coiled wire are very close to each other (the quantity of difference is designated by G1). Namely, the electromagnet in this embodiment has a high accuracy of position of the movable core with respect to the level of an electric current applied to the coiled wire. Accordingly, in a proportional control valve using this electromagnet, the degree of opening of the valve can be controlled with a high accuracy. In a conventional movable core having no projections, the frictional force occurring between the outer circumferential surface thereof and the inner circumferential surface of the pipe member is large. Consequently, the curves corresponding to the curves a, e extend as designated by the letters a', e'. Therefore, the position at which the forwardly moving core stops and the position at which the backwardly moving core stops are b' (stroke of 1.15 mm) and f' (stroke of 1.00 mm); so that a large difference G2 occurs between the quantities thereof. Namely, the variance of the degree of opening of the valve using such a conventional core with respect to the level of an electric current applied to the coiled wire is large.

The above is a description given by taking as an example an electromagnet for a proportional control valve. In the case of other electromagnet, for example, an electromagnet in which the movable core is adapted to be switched between an attraction position and a release position, the movement of the core between these two positions is made lightly without causing a large frictional force to occur. This enables a high-speed operation of a valve to be carried out.

The fixing of the coil unit D to the valve body B may be done as shown in phantom in FIG. 2. Namely, bolts 50 are inserted into the through bores 50a provided in the coil unit D. These bolts are screwed to threaded bores 50b provided in the valve body B. According to this fixing method, it is unnecessary that the coil unit D be held firmly by the cap E. In this case, the circumferential side wall 37 of the cap E may be formed to such a length that enables the front end thereof reaches, for example, a position designated by a reference numeral 37c in FIG. 1.

Figure 8:
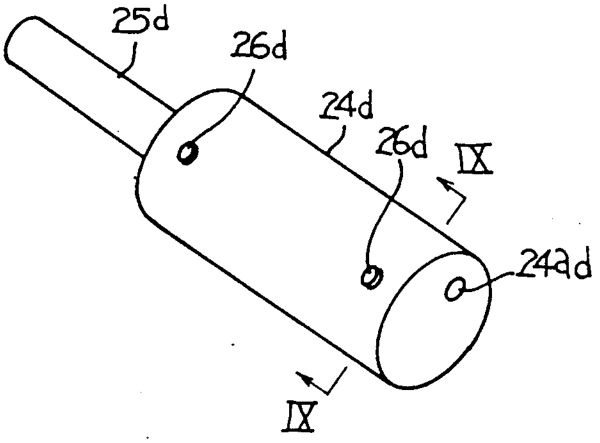
FIG. 8 is a perspective view of a movable core having another shape of projecting portions.
Figure 9:
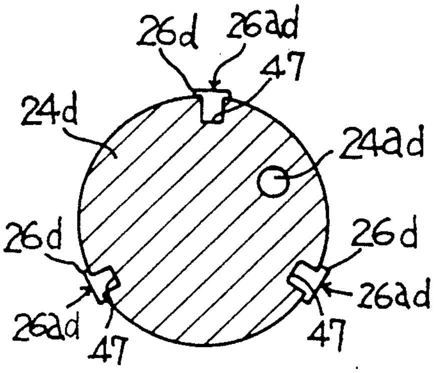
FIG. 9 is a sectional view taken along the line IX—IX in FIG. 8.

Another example of the movable core will now be described with reference to FIGS. 8 and 9 showing the same. These drawings show another shape of, and another means for forming, the projections 26d of the movable core.

In this example, the projections 26d are provided locally on the portions of the outer surface of the movable core which are spaced equally in the circumferential direction. These projections are formed by fixing (for example, press-fitting, driving or bonding) pins in the bores 47 provided in the movable core 24d. The parts of this example the construction of which is considered functionally identical with or equivalent to that of the parts of the example of preceding drawings are designated by the same reference numerals as in these drawings with the letter "d" added thereto, and duplicated descriptions of such parts are omitted. (The letters e, f, g and h are also added in the mentioned order on the basis of the same idea to the reference numerals representing similar parts of other examples shown in FIG. 10 onward, and duplicated descriptions of such parts are omitted.)

Figure 10:
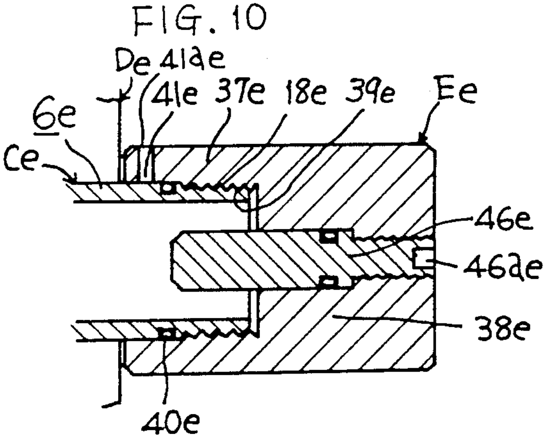
FIG. 10 is a partial longitudinal section of another example of the air vent structure.
Figure 11:
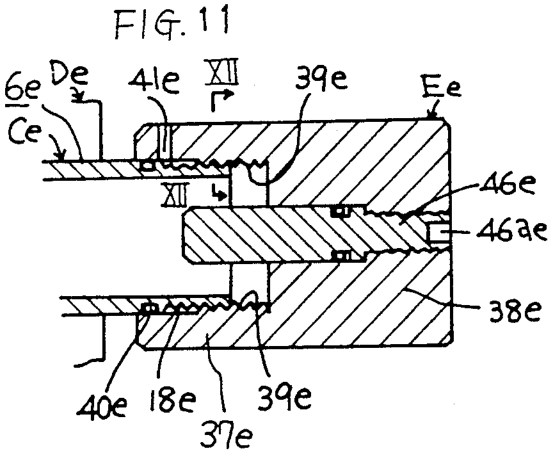
FIG. 11 shows the example of FIG. 10, which is in an air vent operation.
Figure 12:
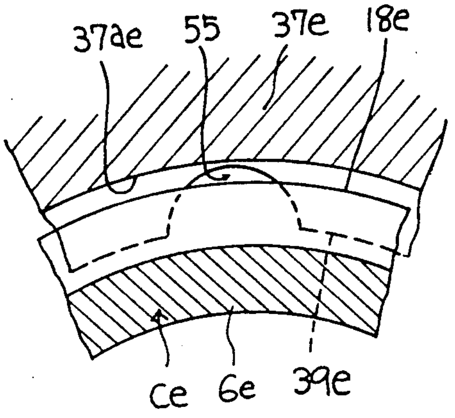
FIG. 12 is an enlarged section taken along the line XII—XII in FIG. 11.

Another example of the air vent hole structure will now be described with reference to FIGS. 10–12. This example and the example of FIG. 1 are different in the positional relation between the threads on the opposed portions of the pipe unit and cap, packing and air vent hole. A packing 40*e* is provided in a pipe unit 6*e*. In a cap Ee, the positional relation between a thread 39*e* and an air vent hole 41*e* is contrary to that of the corresponding parts of the example of FIG. 1. As shown in FIG. 11, when this example is in an air vent condition, the air escapes through a clearance between the threads 39*e*, 18*e*. If an air escape groove 55 is provided as shown in FIG. 12 in the portion of the inner circumferential surface of the cap Ee which is opposed to the air vent hole 41*e* and provided with the thread 39*e*, the air can flow through the air escape groove 55 smoothly and reach the air vent hole 41*e*.

Figure 13:
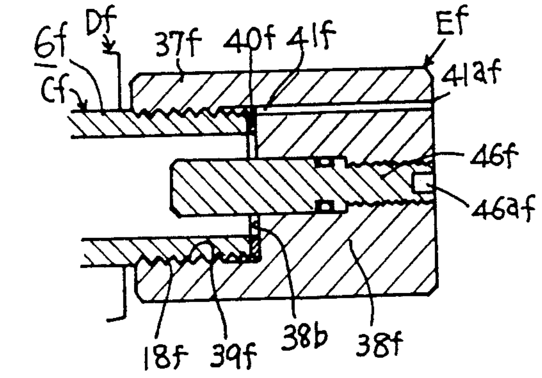
FIG. 13 is a partial longitudinal section of still another example of the air vent structure.
Figure 14:
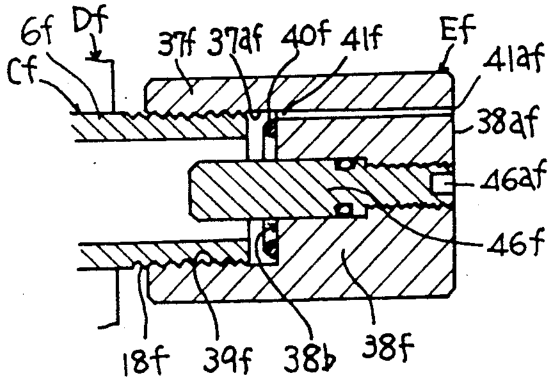
FIG. 14 shows the example of FIG. 13, which is in an air vent operation.

FIGS. 13 and 14 show still another example of the air vent hole structure. In this example, a packing 40*f* is provided annularly in the portion of the inner surface 38*b* of a bottom wall 38*f* of a cap Ef which is opposed to the annular end surface of a pipe unit 6*f*. An air vent hole 41*f* is provided so as to be opened in the portion of the inner surface 38*b* which is radially outer side of the packing 40*f* and close to the inner circumferential surface 37*af* of a circumferential side wall 37*f*.

Figure 15:
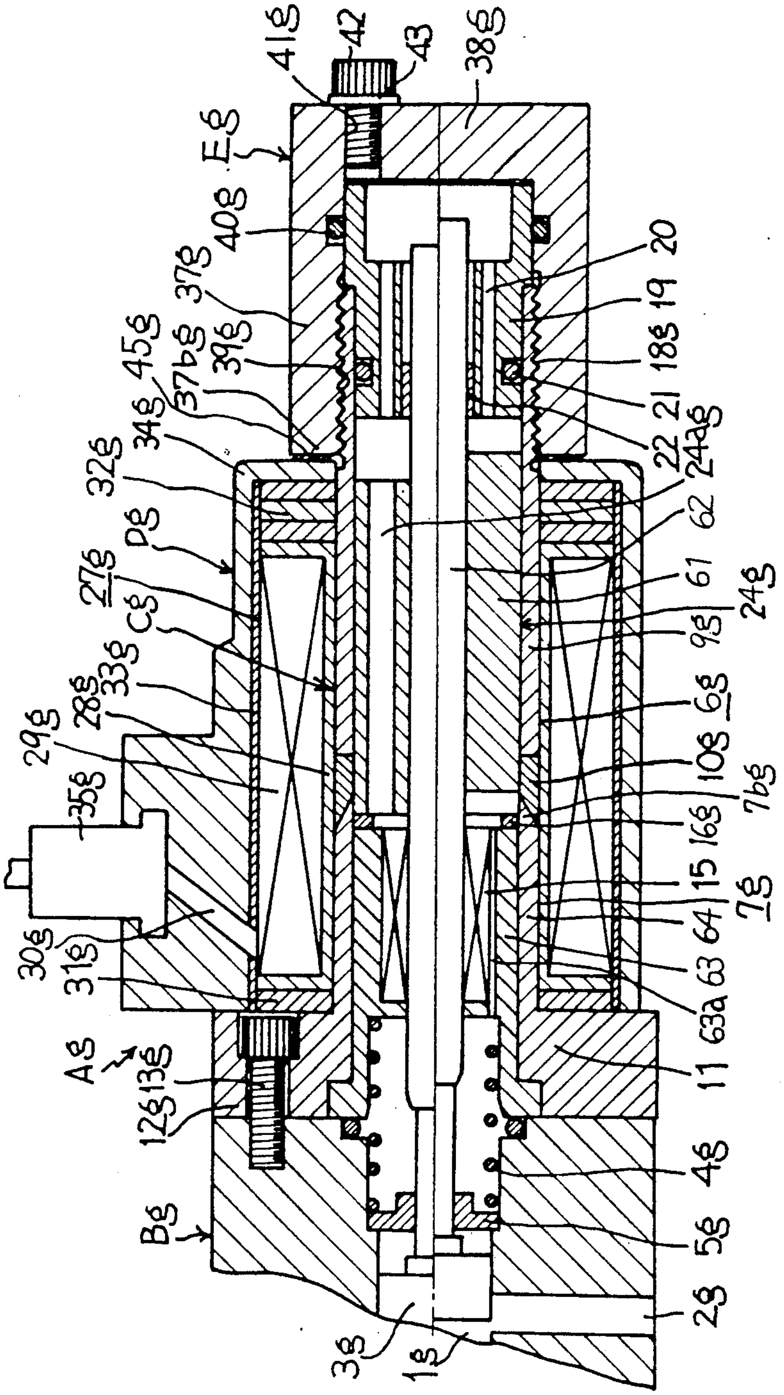
FIG. 15 is a longitudinal section of an electromagnet provided with another type of movable core.

FIG. 15 shows an electromagnet provided with a movable core and an air vent hole structure the types of which are different from those of similar parts of the electromagnet of FIG. 1. A movable core 24*g* in the embodiment of FIG. 15 consists of a movable core body 61 and a shaft 62. The movable core body 62 is formed out of a magnetic material, such as pure iron or low carbon steel. The shaft 62 is formed out of a non-magnetic material (for example, non-magnetic stainless steel). The shaft 62 has an increased surface hardness so that it has an improved abrasion resistance with respect to the sliding thereof against the bearing. This shaft 62 serves also as a transmission member for transmitting the movement of the core body 61 to a spool 3*g*. The core body 61 and shaft 62 are combined unitarily with a bonding agent.

The pipe unit 6*g* housing the movable core 24*g* therein has two bearings 15, 22 which support the shaft 62 of the core 24*g* so that the shaft 62 can be moved forward and backward. The bearing 15 is retained by a stationary core 7*g*. The bearing 22 is retained by a holder 19 fitted in an end portion of the pipe unit 6*g*. Both of these bearings 15, 22 are formed out of a material of a low sliding resistance. A clearance between the outer circumferential surface of the shaft 62 and the inner circumferential surfaces of the bearings 15, 22 is generally 5–6 μm. The holder 19 serves also as a stopper for the movable core 24*g*, and is formed out of a non-magnetic material. The holder 19 is provided with a liquid flow bore 20, and an O-ring 21 for use in sealing the pipe unit 6*g*.

The stationary core 7*g* in the pipe unit 6*g* has a double structure consisting of inner and outer circumferential side elements 63, 64. These elements are combined unitarily by press fitting or clearance fitting. The inner circumferential side element 63 has a fluid flow bore 63*a*. The outer circumferential side element 64 has a flange type yoke 11 formed integrally therewith. The yoke 11 serves also as a mounting portion 12*g* for fastening the pipe unit 6*g* to the valve body Bg, and is joined to the valve body Bg by bolts 13*g*.

The air vent hole structure in the cap Eg will now be described. A female thread is formed in the inner circumferential surface of an air vent hole 41*g*, and a plug 42 is screwed thereto. A known seal washer 43 is interposed between the edge of the air vent hole 41*g* and a head portion of the plug 42 to prevent the liquid from leaking from a space therebetween.

Figure 16:
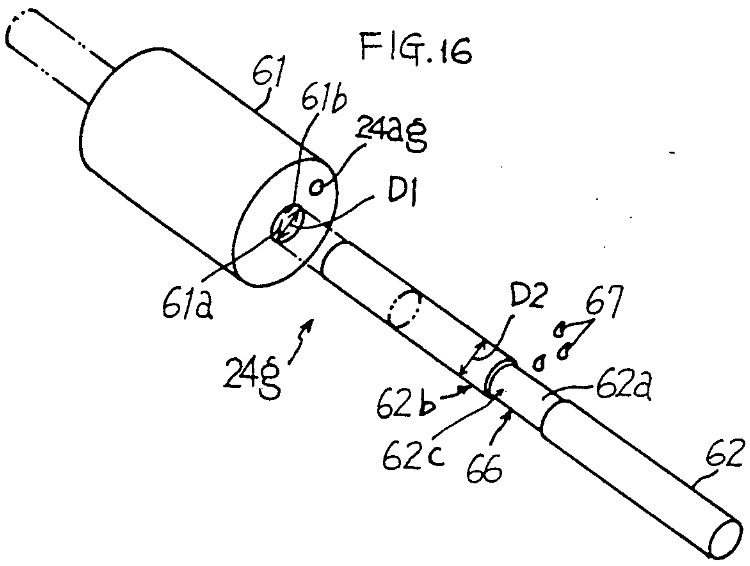
FIG. 16 is an exploded view in perspective illustrating a process for producing the movable core in the electromagnet of FIG. 15.

The production of the movable core 24*g* will now be described with reference to FIG. 16. First, the core body 61 and shaft 62 are produced by, for example, lathe machining. A shaft inserting through bore, i.e. a hollow 61*a* is formed in the central portion of the core body 61. A smaller-diameter section 62*a* for obtaining a bonding margin 66 is formed at a predetermined part of an intermediate portion, i.e. an inserting portion 62*b*, which is positioned in the hollow 61*a*, of the shaft 62. The outer diameter of the core body 61 is, for example, 18 mm, and the length thereof 30–35 mm, the inner diameter D1 of the hollow 61*a* being, for example, 5.990 mm. The outer diameter D2 of the inserting portion 62*b* of the shaft 62 is at a level corresponding to D1, for example, 5.985 mm. Accordingly, the clearance occurring between the surface defining the hollow 61*a* and the outer surface of the inserting portion 62*b* when the latter has been inserted in the former is around 5 μm (forming such a clearance of around 15 μm is allowed in some cases). The depth of the bonding margin 66 is around 0.1–,2 mm, and the length thereof around 12 mm.

A bonding agent 67 is then applied to the smaller-diameter section 62*a* of the shaft 62. The bonding agent 67 used consists of a bonding agent which is hardened thermally or at normal temperature. An anaerobic bonding agent is preferably used since it has an operation efficiency-improving effect. A liquid state bonding agent is regularly used. A jellied bonding agent may also be used.

A part of the shaft 62, i.e. a predetermined part of an intermediate portion of the shaft 62 is inserted and set in the hollow 61*a*. The shaft 62 and core body 61 are then turned relatively. Consequently, the bonding agent spreads circumferentially and uniformly between the inner circumferential surface 61*b* of the hollow 61*a* and the opposed outer circumferential surface 62*c* of the inserting portion 62*b* of the shaft 62. When a highly permeable bonding agent is used, or when the bonding agent is applied uniformly, it spreads uniformly without turning the shaft and core body. The core body 61 and shaft 62 is then kept quiet so as to harden the bonding agent. During this time the core body 61 and shaft 62 may be held immovably by jigs. When a thermosetting bonding agent is used, it is heated so as not to deteriorate the magnetic characteristics of the core body 61 and so as to attain the hardening of the bonding agent.

The movable core 24*g* is thus completed.

The bonding margin-forming smaller-diameter section 62*a* is provided for the purpose of obtaining a sufficiently high bonding strength. However, when a required and sufficiently high bonding strength can be obtained without the smaller-diameter section 62*a* by suitably using a special kind of bonding agent or setting the clearance between the inner circumferential surface of the hollow 61a and outer circumferential surface of the shaft 62 at a special level, the forming of the smaller-diameter section 62a is omitted.

According to the above-described method of producing a movable core, the problems of a conventional method of this kind are solved, and the following effects are obtained. In one conventional method, the combining of a movable core body with a shaft is done by shrinkage fitting. In this method, the movable core body is subjected to heating, so that the magnetic characteristics thereof are deteriorated. In another conventional method, a shaft is inserted into a movable core body, and a pin is then driven through them at right angles to the axes thereof. The core body and shaft are combined unitarily by this pin. However, in this method, the axes of the core body and shaft deviate from each other due to the pin driving operation. Also, the shaft is bent at the portion thereof into which the pin is driven. These phenomena cause the core body to become eccentric with respect to the shaft. When the core body, in which the degree of this eccentricity is high, in the electromagnet receives a magnetic force, the attractive force which the core body receives in the direction at right angles to the axis thereof becomes large. As a result, the frictional force occurring between the shaft and bearing therefor increases to obstruct a smooth movement of the movable core.

According to the method embodying the present invention, the movable core 24g is produced by inserting the shaft 62 through the hollow 61a formed in the core body 61, and combining these two parts with each other unitarily with the bonding agent 67. In this method, the bonding agent 67 is distributed uniformly and very easily between the inner and outer circumferential surfaces of the hollow and shaft. In consequence, the axes of the shaft 62 and core body 61 are aligned easily. Also, the fixing of these two parts to each other is done quietly owing to the hardening of the bonding agent 67. As a result, the thermal deterioration, which occurs in the above-mentioned method employing shrinkage fit, of the movable core body 61 and shaft 62 does not occur, and excellent magnetic characteristics are maintained. In addition, no mechanical deformation occurs in the movable core body 61 and shaft 62. Accordingly, a movable core having a high mechanical accuracy can be manufactured.

An electromagnet having a movable core 24g thus manufactured has the following advantages. The axes of the movable core body 61 and shaft 62 are aligned with a very high accuracy, and the eccentricity of the core body 61 with respect to the shaft 62 does not substantially occur. Therefore, in the case where the shaft 62 is supported with a high accuracy on the bearings 15, 22, a radial deviation of the core body 61 from the permeable portion 9g in the pipe unit 6g does not occur. When the core body 61 in this condition receives a magnetic force and moves in the axial direction thereof, it does not substantially receive an attractive force directed at right angles to the axis thereof. Accordingly, the frictional force occurring between the shaft 62 and bearings 15, 22 is small. Consequently, the core 24g is moved very smoothly.

Figure 17:
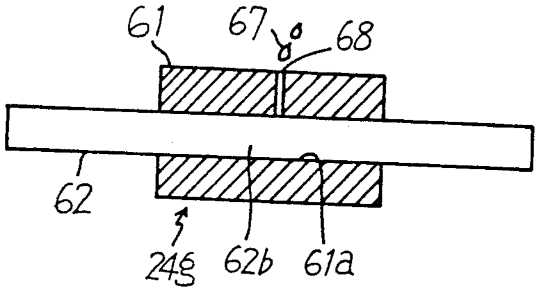
FIG. 17 is a longitudinal section illustrating another method of applying a bonding agent to a movable core and a shaft.
Figure 19:
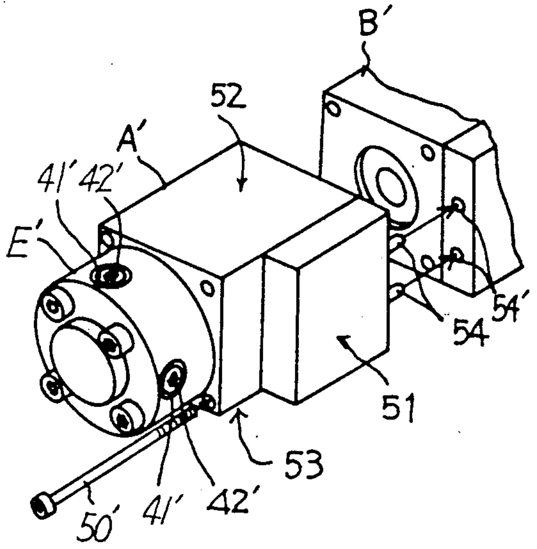
FIG. 19 is a perspective view of a conventional example.

The applying of the bonding agent to the inner circumferential surface of the hollow 61a and the outer circumferential surface of the shaft 62 may be done by pouring the bonding agent via an end of the hollow 61a thereinto after the completion of the insertion of the shaft 62 therethrough. In such a case, a liquid bonding agent having a high permeability is preferably used. In this bonding agent application method, a bonding agent injection bore 68 communicating with the hollow 61a may be provided in the core body 61 as shown in FIG. 17, so as to pour the bonding agent 67 therefrom into the hollow 61a.

An air vent operation in the above-described air vent hole structure is carried out as follows. First, the air vent hole 41g is set in the highest position. The plug 42 in this air vent hole 41g is then loosened. When the air in the pipe unit has all escaped, so that the liquid begins to leak out from the air vent hole 41g, the plug 42 is tightened to close the air vent hole 41g. The other operations are identical with the corresponding operations in the embodiment of FIG. 1.

In the case where the electromagnet Ag is mounted in a vertically extending state with the air vent hole 41g in the highest position, the air vent operation may be carried out with the air vent hole structure kept as it is.

Figure 18:
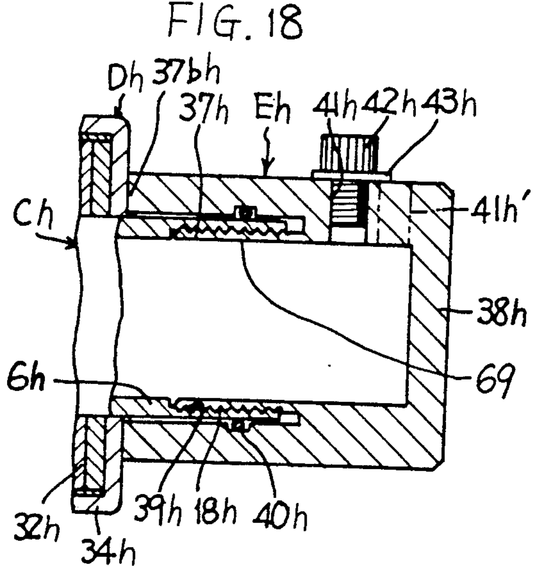
FIG. 18 is a partial longitudinal section of another example of the structure for connecting the pipe unit and cap together.

FIG. 18 shows another example of the structure for connecting the pipe unit and cap together. In this example, a female thread 39h is provided in the inner circumferential surface of a pipe unit 6h, and a male thread 18h on the outer circumferential surface of a connecting tube portion 69 of a circumferential side wall 37h of a cap Eg. An air vent hole may be formed in a position designated by a reference numeral 41h'.

We claim:

1. An electromagnet for solenoid valves, having a pipe unit provided with a hollow therein to house a movable core that can be moved forward and backward, and a mounting portion at one end part thereof, which is used to join said pipe unit to a valve body with an opening at said end part of said pipe unit communicating with a liquid passage in said valve body; a cap used for closing an opening at the other end part of said pipe unit and joined to the same end part thereof; a cylindrical coil body fitted around said pipe unit; and a movable core housed in said hollow in said pipe unit so that said core can be moved forward and backward therein, characterized in that said cap is connected rotatably to said pipe unit, and said rotatable cap is provided with an air vent hole opened in the inner circumferential surface of a circumferential side wall thereof.

2. An electromagnet for solenoid valves according to claim 1, wherein said air vent hold is provided therein with a plug which can be tightened and loosened to close and open said air vent hole.

3. An electromagnet for solenoid valves according to claim 1, wherein said cap is threaded with said pipe unit, a liquid leakage preventing packing is provided in a position in which said cap and said pipe unit in an engagement-completed state are opposed to each other, said air vent hole being opened in the portion of the inner circumferential surface of said cap which communicates with the portion of the interior of said pipe unit which is on the outer side of said packing when said cap and said pipe unit are in an engagement-completed state, and with the portion of the interior of said pipe unit which is on the inner side of said packing when said cap and said pipe unit are in a non-engagement-completed state.

4. An electromagnet for solenoid valves according to claim 1, wherein said movable core is provided on a plurality of portions of the outer circumferential surface thereof with projections adapted to contact the inner circumferential surface of said pipe unit and fix the position of the outer circumferential surface of said movable core with respect to the inner circumferential surface of said pipe unit.

* * * * *